United States Patent [19]

Hagiwara

[11] Patent Number: 5,161,658
[45] Date of Patent: *Nov. 10, 1992

[54] VISCOUS COUPLING

[75] Inventor: Makoto Hagiwara, Utsunomiya, Japan

[73] Assignee: Viscodrive Japan Kabushiki Kaisha, Tokyo, Japan

[*] Notice: The portion of the term of this patent subsequent to Jan. 14, 2009 has been disclaimed.

[21] Appl. No.: 669,880

[22] Filed: Mar. 14, 1991

[30] Foreign Application Priority Data

Mar. 16, 1990 [JP] Japan .................................. 2-64383

[51] Int. Cl.⁵ ...................... F16D 47/06; F16D 35/00
[52] U.S. Cl. .................... 192/48.3; 192/57; 192/58 B; 192/70.14
[58] Field of Search ...................... 192/48.3, 57, 58 B, 192/58 C, 70.14; 180/248

[56] References Cited

U.S. PATENT DOCUMENTS

| 4,726,455 | 2/1988 | East | 192/70.14 X |
| 4,885,957 | 12/1989 | Taureg et al. | 192/57 X |
| 4,899,859 | 12/1990 | Teraoka | 192/57 X |
| 5,080,210 | 1/1992 | Hagiwara | 192/48.3 |

FOREIGN PATENT DOCUMENTS 62-98033  5/1987  Japan .................................. 192/58 B Primary Examiner—Richard Lorence
Attorney, Agent, or Firm—Harness, Dickey & Pierce

[57] ABSTRACT

A novel viscous coupling for transmitting rotary torque via a viscous fluid has first and second torque transmission members, a working chamber hermetically packed with a viscous fluid, and first and second plates alternately disposed in the working chamber. The transmission of rotary torque between the first and second transmission members is carried out via viscous resistance of the viscous fluid between the first and second plates. The aforesaid viscous coupling is characterized by providing with a multi-plate clutch to adjust transmission power of the rotary torque between at least one of the plates and the torque transmission members. The coupling includes an externally operable engaging means for fastening the multi-plate clutch by pressing clutch plates of the multi-plate clutch. Also, the coupling has passages for leading the viscous fluid to contact portions between the clutch plates and the plates.

5 Claims, 4 Drawing Sheets

1

VISCOUS COUPLING

BACKGROUND OF THE INVENTION

1. Field of the Invention

The present invention relates to a viscous coupling for vehicles and the like. The coupling utilizes, in action, the viscous resistance of a viscous fluid employed therein to transmit rotary torque.

2. Description of the Prior Art

As is well known, conventional viscous coupling includes the following construction: a first torque-transmitting member; a second torque-transmitting member rotatably arranged relative to the first torque-transmitting member; a working chamber filled with a viscous fluid; a plurality of first plates mounted on the first torque-transmitting member to be non-rotatable relative to the first torque-transmitting member; and a plurality of second plates mounted on the second torque transmitting member to be non-rotatable relative to the second torque-transmitting member, the second plates are interleaved with the first plates in the working chamber.

The viscous resistance of the viscous fluid with respect to the torque-transmitting members to the other torque-transmitting members provides a means to transmit torque between the two torque-transmitting members. The torque automatically varies to be substantially proportional to a difference in rotational speed between the torque-transmitting members.

Further, Japanese Utility Model Laid-Open No. 01-109626 discloses a viscous fluid clutch utilizing the abovementioned conventional viscous coupling. The clutch described in this publication intermittently operates the clutch by the utilization of volume change of a piezoelectric element. The torque is intermittently transmitted between one of the plates and the torque-transmitting member of the viscous coupling.

According to this suggested clutch, one of the plates and the torque-transmitting member are coupled at the time of the expansion of the piezoelectric element and they are uncoupled at the time of its shrinkage. When they are coupled, the viscous fluid slowly flows from contact portions between the plates and piezoelectric element due to the viscosity of the viscous fluid. At the time of shrinkage of the piezoelectric element, the flow of the fluid into the contact portions is slow. For this reason, the response is slow and unsatisfactory in the cases of both coupling and uncoupling of the viscous coupling by the clutch.

SUMMARY OF THE INVENTION

An object of the present invention is to provide a viscous coupling which can intermittently transmit rotary torque between the torque-transmitting members by a clutch carried in the viscous coupling and which may improve the intermittent response therebetween.

According to the present invention, a viscous coupling comprises: a first and second torque-transmitting member rotatable relative to each other; a working chamber filled with a viscous fluid; and a plurality of first plates and second plates interleaved in the working chamber. The transmission of rotary torque between the first and second torque-transmitting members is carried out via viscous resistance of the viscous fluid between the first and second plates. The aforesaid viscous coupling provides a multi-plate clutch to adjust transmission power of the rotary torque between at least one of the plates and the torque-transmitting members. The coupling also provides an externally operable fastening means to fasten the multi-plate clutch by pressing clutch plates of the multi-plate clutch. Further, the coupling provides passages for leading the viscous fluid to contact portion between the clutch plates and the plates.

In the present invention, the first and second plates adjacent to the clutch plates are coupled with or uncoupled from the torque-transmitting member by fastening or unfastening the multi-plate clutch with the aid of the fastening means. At the time of both the operations, the viscous fluid can easily flow through the passage of the contact portions between the plates and the clutch plates, i.e., the viscous fluid can easily flow inwardly and outwardly through the passages, whereby the contact portions may be rapidly connected and separated.

DESCRIPTION OF THE PREFERRED EMBODIMENTS

Figure 1A:
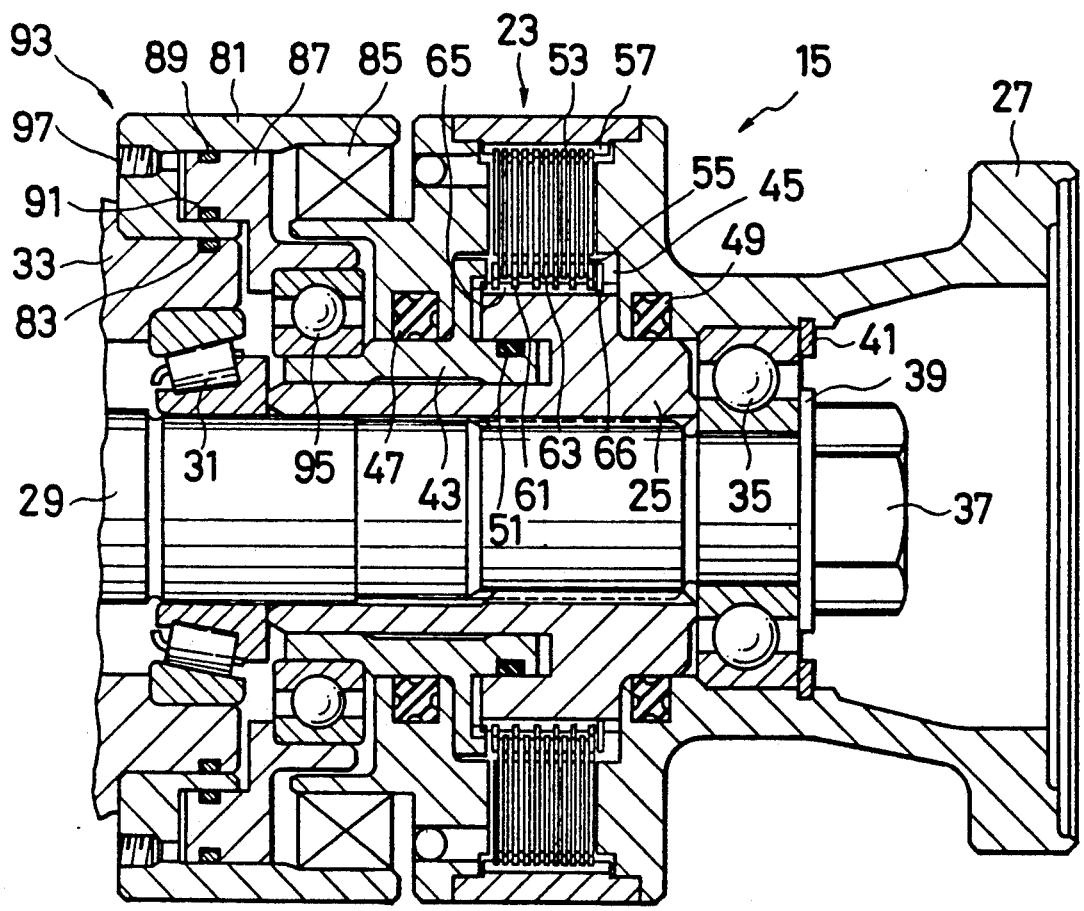
FIG. 1A is a sectional view of one embodiment of the present invention.

Now, one embodiment of the present invention will be described in detail in reference to FIG. 1A, 1B, 2A, 2B and 3. FIG. 3 shows the power system of a four-wheel drive car (4WD) in which the viscous coupling of the present invention is employed as indicated by numeral 15.

The power system includes of an engine 1, a transmission 3, a front differential gear 5, right and left front wheels 7 and 9, a transfer 11, a propeller shaft 13, a viscous coupling 15 of this invention, a rear differential gear 17, right and left rear wheels 19 and 21, and the like.

As shown in FIG. 1A, a housing 23 (the first transmitting member) receives a rotatably disposed hub 25 (the second transmitting member). The housing 23 is connected to the propeller shaft 13 with the interposition of an integrally provided flange portion 27. The housing 23 can be rotated by driving force from the engine 1. The hub 25 is spline-secured around a driving pinion shaft 29 of the rear differential gear 17. This shaft 29 is supported by a carrier 33 of the rear differential gear 17 via a bearing 31. Also, the housing 23 is supported by the shaft 29 via a bearing 35. To prevent axial movement of the housing 23 on the shaft 29, the shaft 29 is provided on its front end with a lock nut 37, a washer 39, and a snap ring 41. A pressing member 43 between the housing 23 and the hub 25 is inserted from the rear side movable in the axial direction.

A working chamber 45 is defined by the members 23, 25 and 43 and hermetically packed with a silicone oil (a viscous fluid) having a high viscosity. As shown in FIG. 1A, X-rings 47 and 49 (which are seals having an X-shaped section) are disposed between the members 23 and 43 and between the members 23 and 25, respectively, and an O-ring 51 is disposed between the members 25 and 43, whereby the working chamber 45 is liquidtight.

Figure 1B:
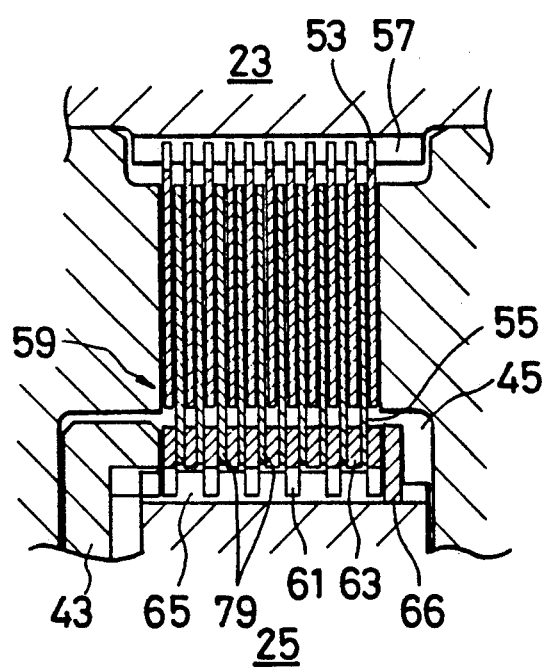
FIG. 1B is an enlarged partial view of FIG. 1A.

As enlargedly shown in FIG. 1B, outer plates 53 (first plates) and inner plates 55 (second plates) are alternately arranged or interleaved in the working chamber 45. The outer plates 53 are axially movably engaged with an axially extending spline 57 disposed on the inner periphery of the housing 23, but they are not movable in a peripheral direction of the housing 23. On the internal end sides of the inner plates 55, clutch plates 61 (third plates) of a multi-plate clutch 59 are arranged alternately or interleaved with the inner plates 55. The multi-plate clutch 59 includes clutch plates 61 and spacers 63 which are alternately arranged between the inner plates 55. The clutch plates 61 are axially movably engaged with an axially extending spline 65 disposed on the outer periphery of the hub 25. Therefore, when the clutch 59 is uncoupled, the inner plates 55 are not rotated with the hub 25. A snap ring 66 is fixed on a certain position of the hub 25 in front of the multiplate clutch 59, and in the rear of the multi-plate clutch 59, the front end portion of the pressing member 43 is axially movably engaged with the spline 65. Therefore, the pressing member 43 can be rotated with the hub 25.

Figure 2A:
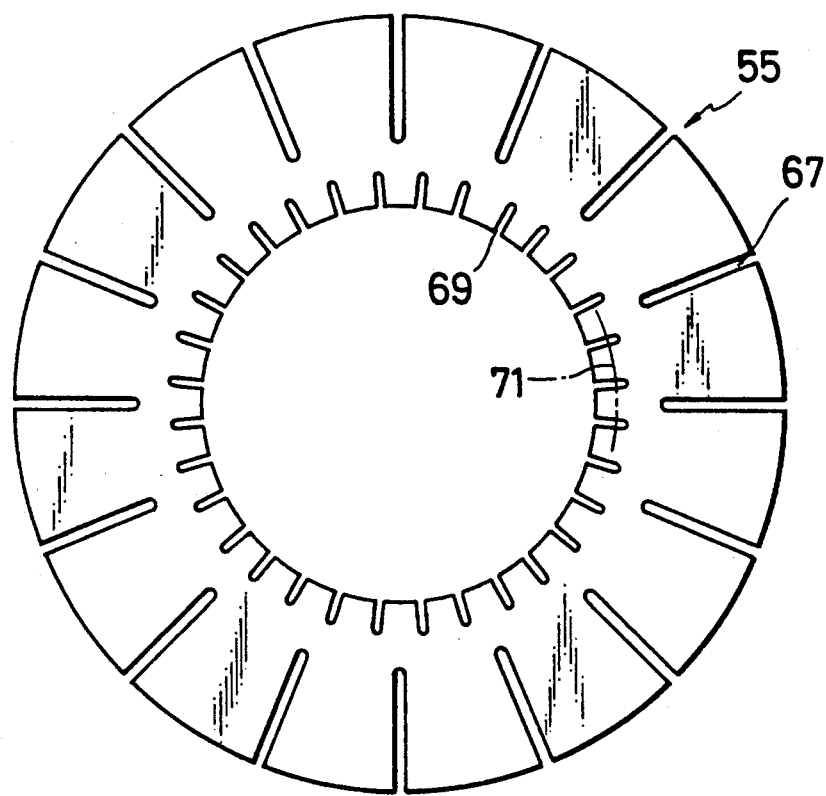
FIG. 2A is a plan view of an inner plate.
Figure 2B:
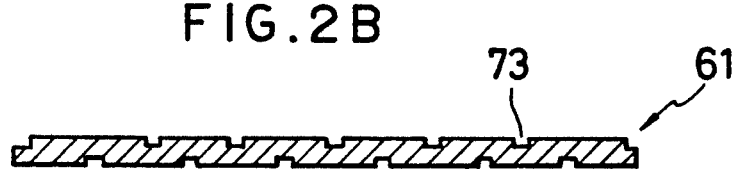
FIG. 2B and 2C are a side view and a plan view of a clutch plate, respectively.
Figure 2C:
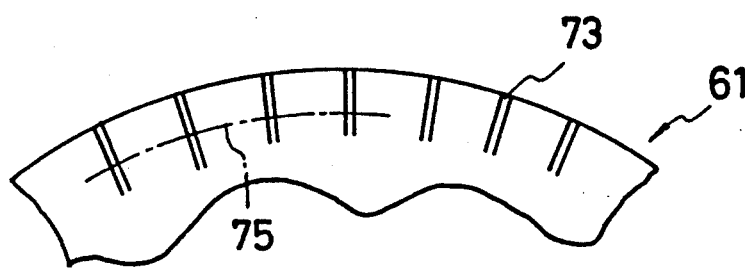
Figure 3:
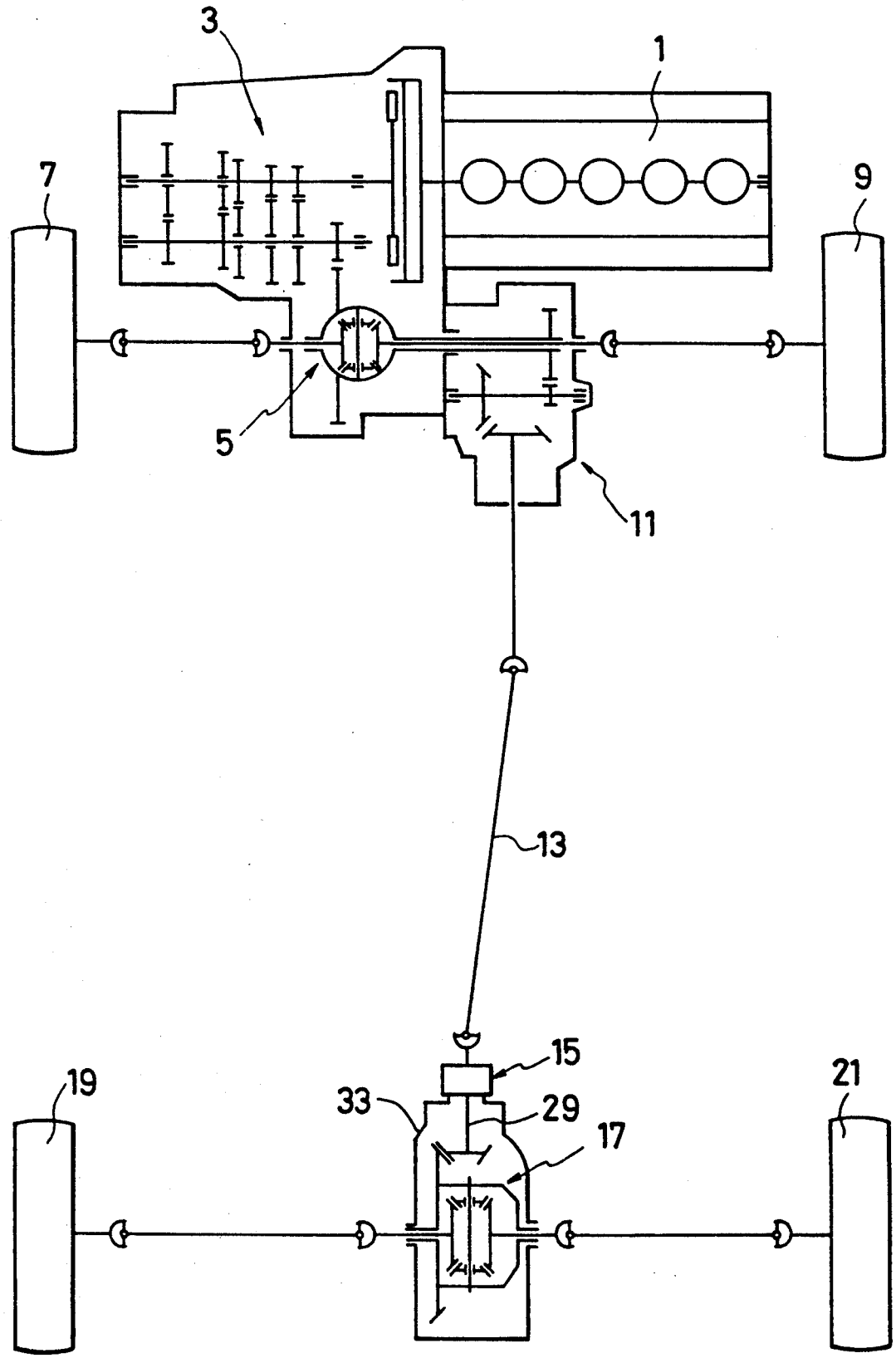
FIG. 3 skeleton mechanism of the power system of a car in which the embodiment of the present invention is employed.

As shown in FIG. 2A, each inner plate 55 is provided with a first slits 67 on the outer periphery thereof with second slits 69 on the inner periphery thereof (passages). The slits 69 extend radially and outwardly over a radial range indicated by a phantom line 71 which shows the outer periphery of the multi-plate clutch 59. Furthermore, as shown in FIGS. 2B and 2C, each clutch plate 61 is provided on both its surfaces with radial grooves 73 (passages). The grooves 73 extend radially and inwardly over a radial range indicated by a phantom line 75 which shows the outer periphery of the inner plate 55. Also on both the surfaces of each spacer 63, grooves (passages) are formed which are similar to the above-mentioned grooves 73.

When the pressing member 43 is moved forwardly, the inner plates 55,' the clutch plates 61 and the spacers 63 are pressed between the snap ring 66 and the front edge of the pressing member 43. The result of the pressing is the multi-plate clutch 59 is brought into a coupled state and the inner plates 55 are coupled with the hub 25. When the pressure by the pressing member 43 to the clutch plates 61 is released, the multi-plate clutch 59 is uncoupled, so that the inner plates 55 are also uncoupled from the hub 25.

In coupling and uncoupling the multi-plate clutch 59, a silicone oil is allowed to easily flow inwardly and outwardly through the slits 69 of the inner plates 55 and the grooves 73 of the inner plates 55 and the spacers 63 in the contact portions 79 between the inner plates 55 and the clutch plates 61 and between the inner plates 55 and the spacers 63. Therefore, the viscosity of the silicone oil functions to extremely shorten the operation lag of the multi-plate clutch 59, so that the intermittent response is improved for the coupling and uncoupling of the viscous coupling.

On the right side of the housing 23, a ring-like cylinder 81 is secured and supported on the front outer periphery of the carrier 33. An O-ring 83 is disposed between the cylinder 81 and the carrier 33, and a seal 85 is interposed between the cylinder 81 and the housing 23.

A piston 87 is axially slidably inserted into the cylinder 81. O-rings 89 and 91 are provided in the sliding portion between the piston 87 and the cylinder 81 so that the interior of the cylinder 81 is kept in a liquidtight condition. The cylinder 81 and the piston 87 constitute an actuator 93 (a fastening means). The piston 87 is connected to the pressing member 43 via a bearing 95. The rotation of the pressing member 43 is shut off by the bearing 95, and thus the rotation is not transmitted to the piston 87 and thus the latter is not rotated.

When hydraulic pressure is applied to a hydraulic port 97 of the actuator 93 from a pressure source through a control valve, the hydraulic pressure functions to move the pressing member 43 in a direction to the right, see FIG. 1, via the bearing 95, with the result engaging the multi-plate clutch 59. The engaging force can be adjusted by controlling the hydraulic pressure, and when the application of the hydraulic pressure is stopped, the multi-plate clutch 59 is uncoupled. This operation of the actuator 93 can be achieved manually from a driving seat, and it is also possible to take a constitution by which the automatic operation is performed in compliance with handling conditions and road surface conditions.

In the above-mentioned embodiment, the viscous coupling 15 is constituted as described above, but the multi-plate clutch can be arranged on the side of the outer plates.

Next, the mechanism of the viscous coupling 15 will be described.

When the multi-plate clutch 59 is engaged, the inner plates 55 are coupled with the hub 25 by strength corresponding to the engaging force. The rotation of the housing 23 is transmitted to the inner plates 55 through the outer plates 53 by shear resistance of the silicone oil to rotate the hub 25 via the multi-plate clutch 59. At this time, if a large rotary difference is present between the outer plates 53 and the inner plates 55, this difference is limited noticeably, and in consequence, large torque is transmitted. Conversely, if a small rotary difference is present, this difference is allowed largely, and in consequence, small torque is transmitted.

When the multi-plate clutch 59 is locked, the rotary difference between the outer plates 53 and the inner plates 55 is equal to the rotary difference between the housing 23 and the hub 25, the viscous coupling 15 provides maximum torque transmission properties. In addition, when the engaging force of the multi-plate clutch 59 is weakened, small torque is transmitted, and thus the torque transmission properties of the viscous coupling can be adjusted continuously.

As described above, in the present invention, the multi-plate clutch 59 may be rapidly coupled and uncoupled. Thus, a quick response is provided to couple and uncouple the viscous coupling 15. Furthermore, about the half of the clutch plates 61 constituting the multi-clutch 59 can be replaced with the spacers 63. The spacers are not engaged with the hub 25, and thus the relation with the torque transmission is cut off. Accordingly, when the multi-plate clutch 59 is uncoupled, the drag torque of the viscous coupling 15 (the drag torque due to the viscosity of the silicone oil) is small. However, the multi-plate clutch 59 can also be constituted of the clutch plates 61 alone without using any spacers. Next, the function of the viscous coupling 15 will be described in reference to the power system shown in FIG. 3.

When the multi-plate clutch 59 is uncoupled, the rotation of the engine 1 is varied by the transmission 3 and then shared between the right and left front wheels 7 and 9 through the front differential gear 5. When the multi-plate clutch 59 is coupled, the driving force from the engine 1 is transmitted to the rear differential gear 17, via the viscous coupling 15, and shared between the right and left rear wheels 19 and 21, and as a result, the car is ready for 4WD drive.

Even in the state of the 4WD drive, when a rotation between the front wheels and the rear wheels is small as is the case on a good road surface, the driving force is scarcely transmitted to the rear wheels 19, 21 due to the characteristics of the viscous coupling 15. The car is running in a two-wheel drive (2WD) state with decreased fuel costs. However, when the front wheels 7 and 9 slip, for example on a rough road, and a large rotation difference is present between the front wheels and the rear wheels, the driving force is transmitted to the rear wheels 19, 21, via viscous coupling 15, to improve driving performance on the rough road.

Since the small rotational difference which occurs between the front wheels and the rear wheels is absorbed by the viscous coupling, a smooth turning drive is possible thus preventing a tight corner braking phenomenon at the time of the low-speed steep turning drive.

When the multi-plate clutch 59 is uncoupled, the rear wheels 19, 21 are free to rotate and the above-mentioned drag torque does not occur, and in consequence, the car takes the 2WD running condition. In this condition, the interference of braking force between the front wheels and the rear wheels by the viscous coupling 15 is prevented, and for example, the normal function of an antilock braking system can be protected. The car can be rapidly switched from 2WD to 4WD by the viscous coupling 15, thus improving driving characteristics and safety.

In this connection, with regard to the passages disposed in the contact portions 79, for example, the inner plates 55 may be provided with grooves, and the clutch plates 61 and the spacers 63 may be provided with slits. The passages may be formed in any of the inner plates 55, the clutch plates 61 and the spacers 63. Moreover, these slits and grooves may be inclined toward a rotational direction. If the edges of the slits and the grooves are beveled or rounded, the silicone oil can be allowed to effectively flow into and out of the contact portions 79.

According to the present invention, the adjustment of torque transmission properties and the intermittent transmission of torque can be effected by a carried multi-plate clutch. The viscous fluid is enabled to easily flow into or out of contact portions of the clutch through suitably disposed passages, whereby a quick response is obtained for the adjustment of torque.

What is claimed is:

1. A viscous coupling for transmitting rotary torque comprising:
    a first and second torque transmitting member rotatable with respect to one another;
    a working chamber filled with viscous fluid, said working chamber associated with said first and second torque transmitting members;
    a plurality of first and second plates alternatively disposed in said working chamber, said plurality of first and second plates respectively coupled with said first and second torque transmitting members wherein viscous resistance of said viscous fluid between said plurality of first and second plates transmits rotary torque between said first and second members; and
    clutch means for adjusting transmission power of the rotary torque between at least one of said first or second plurality of plates and said first and second member, said clutch means interleaved with said first or second plurality of plates in said working chamber.

2. The viscous coupling according to claim 1 further comprising an external control means for engaging and disengaging said clutch means.

3. The viscous coupling according to claim 1 wherein said clutch means further comprises a plurality of clutch plates interleaved with said plurality of first or second plates.

4. The viscous coupling according to claim 3 wherein said first or second plates of the viscous coupling which are in contact with said clutch plates are provided with grooves or slits which, radially, extend at least over the radial region of contact with said clutch plates.

5. The viscous coupling according to claim 3 wherein said clutch plates are provided with radially opening grooves or alits which face adjoining plates of the viscous coupling and which extend at least over the radial region of contact with said first or second plurality of plates.

* * * * *